(No Model.)
H. WOHLENBERG.
SCREW THREADING LATHE.
No. 319,943. Patented June 9, 1885.
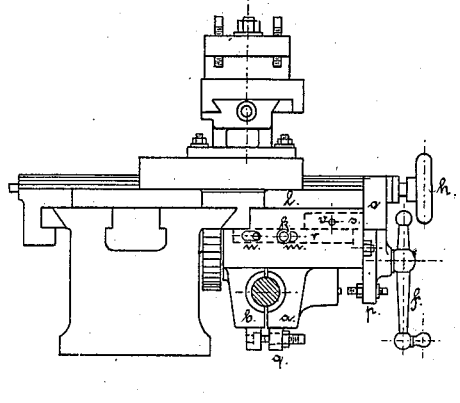
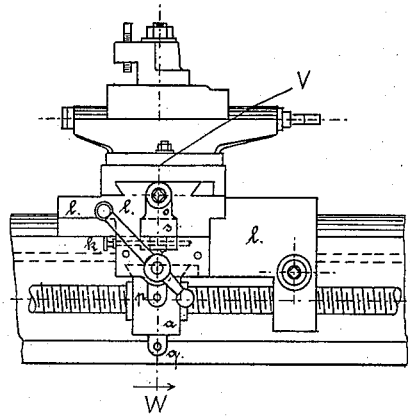
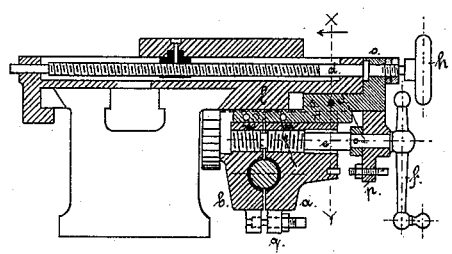
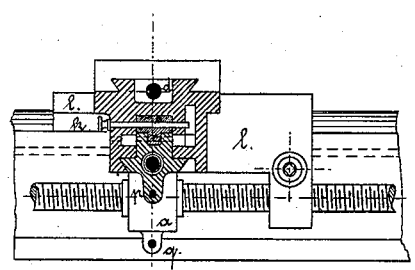
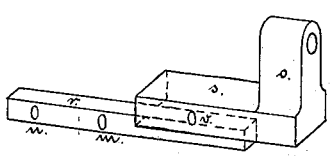
Witnesses:
Inventor.
Hermann Wohlenberg,
By Jas. L. Ewin,
Attorney.

UNITED STATES PATENT OFFICE.

HERMANN WOHLENBERG, OF HANOVER, PRUSSIA, GERMANY.

SCREW-THREADING LATHE.

SPECIFICATION forming part of Letters Patent No. 319,943, dated June 9, 1885.

Application filed October 28, 1884. (No model.)

*To all whom it may concern:*

Be it known that I, HERMANN WOHLENBERG, a subject of the German Emperor, residing at Hanover, in the Empire of Germany, have invented a certain new and useful Improvement in Screw-Threading Machines; and I do hereby declare that the following is a full, clear, and exact description of the invention.

This invention relates to feed devices in lathes, and to that class of improvements thereof which are designed to simplify the work of the operator when cutting screw-threads, so that only little skill shall be required. In known lathes the return travel of the saddle is either effected by putting the driving-belt on a reversing-pulley, so that the whole lathe runs backward, or by disconnecting the leading-screw from the saddle by opening the leading-screw nut, and then running the saddle back by hand through the medium of rack and pinion.

The present invention is designed for the latter class of lathes; and it consists, primarily, in the combination, with the split leading-screw nut and the saddle-spindle, of a direct connection in the form of a coupling block and pin, substantially as hereinafter set forth, for so transmitting the motion of the halves of the leading-screw nut, when opened or closed, to the saddle-spindle, that when the split nut is opened the saddle-spindle and the tool-rest receive a motion which will withdraw the tool from the thread so far as to allow the return of the saddle to the starting-point, while the closing of the split nut will automatically place the tool to the same depth as before, and so that the saddle-spindle is not hindered from the movement necessary for the taking of a new cut.

A sheet of drawings accompanies this specification as part thereof.

Figure 1 of these drawings is a side elevation of my improved lathe-saddle and tool-rest. Fig. 2 is an end elevation of the same. Fig. 3 represents a vertical section on the line V W, Fig. 2. Fig. 4 represents a vertical section on the line X Y, Fig. 3. Fig. 5 is a detail in perspective of the "coupling-block" *r s o*, Figs. 1 and 3.

The opening and closing of the split nut by the movements of its halves *a b* are effected by means of a right-and-left-handed screw, *e*, Fig. 3, screwing into corresponding threads in the halves of the split nut. The turning of the spindle or screw *e* can be effected direct by a hand-lever, *f*, situated on it, or indirectly by levers or wheel-gearing, when a quick mode of operation is desired. Above the split nut *a b* a forged piece, *r s o*, Figs. 1 and 3, (shown in detail, Fig. 5,) is inserted in the tool-carriage or saddle. On account of its use I call said forged piece a "coupling-block." This coupling-block, the convenient shape of which is a rectangular prism, slides into a guide parallel to the saddle-guide, and formed partly by the tool-carriage and partly by the guiding-heads of the nut *a b*. (See Figs. 3 and 4.) The front end of the block is supplied with a loop, *o*, which embraces the saddle-spindle *d*, the latter being supplied on one side thereof with a collar and on the other with a nut and check-nut, as shown in Fig. 3. Consequently the saddle-spindle, with the tool-rest and tool, must join in every movement of the coupling-block. If, now, according to the purpose of the invention, the movement of the halves of the split nut is to be transmitted by means of the block to the saddle-spindle and the tool, the application of a detachable connection between the coupling-block and the half-nuts is required. For this purpose a "bolt," *r*, is formed on the lower side of the block, to extend over the two half-nuts, and into or through the guiding-heads of the latter. This bolt *r* is supplied with holes *n* and *m*, Figs. 1, 3, and 5, over each half-nut, which correspond with holes in the before-mentioned guiding-heads and lathe-saddle. It therefore only requires a pin, *k*, with a convenient handle, to be inserted into the corresponding holes to bolt one or the other of the half-nuts to the coupling-block. The holes in the saddle are of an oblong shape, so as not to prevent the sliding movement of the steel pin *k*. (See Fig. 1.)

The operation proceeds as follows: When an outside thread is to be cut, the operator puts the pin *k* into the hole *m*, whereby the half *a* of the split nut nearest to him is bolted to the block *r s o*. When the operator now, after the tool has run through the thread, opens the split nut, by means of a turning movement of the lever *f*, the front half, *a*, at the same time moves the tool-rest with the tool as far back as the adjustable screw $p$ will allow. When the operator has returned the saddle to the starting-point of the thread, in the manner before mentioned, and closes the nut upon the leading-screw, he will in the same act push forward the tool-rest with the tool at the same depth as before. This is properly limited by the closing-stop $q$ of the split nut. It now only requires a turn or part turn of the saddle-spindle $d$, by means of its hand-wheel $h$, to set the tool-rest forward for a fresh cut. If an inside thread is to be cut, the operator has to set the pin $k$ into the hole $n$ of said coupling-block and the corresponding hole of the half-nut $b$ which is farthest from him. The operation then is the same as before, except that all movements are in the opposite direction.

When the lathe has to be used for general work, the coupling-block may be bolted direct to the saddle $l$ by means of the pin $k$, instead of to the half-nuts. For this purpose holes $v$ are provided in the part $s$ of the said coupling-block, and at corresponding places in the cheeks of the saddle $l$, and the pin $k$ is inserted therein, as shown in Fig. 4. The tool-rest spindle $d$ is now unaffected by opening and closing the split nut, and the latter may be manipulated in customary manner to suit the work.

Having thus described my said improvement in lathes, I claim as my invention and desire to patent under this specification—

1. In combination with the split leading-screw nut $a\ b$, the coupling-block $r\ s\ o$, and pin $k$, for alternately coupling the halves of the split nut with the saddle-spindle, in the manner set forth.

2. In combination with the split leading-screw nut $a\ b$, saddle-spindle $d$, coupling-block $r\ s\ o$, and pin $k$, the stops $q$ and $p$, to automatically limit the movements of the halves of the split nut, and of the tool therewith, in the manner set forth.

This specification signed by me this 1st day of September, 1884.

HERMANN WOHLENBERG.

Witnesses:
WILLIAM C. FOX,
JOS. KRACKE.